(12) United States Patent
Lei

(10) Patent No.: US 6,275,633 B1
(45) Date of Patent: Aug. 14, 2001

(54) FLEXIBLE LIGHT-GUIDING PIPE

(76) Inventor: Jin Huei Lei, P.O. Box 82-144, Taipei (TW)

(*) Notice: Subject to any disclaimer, the term of this patent is extended or adjusted under 35 U.S.C. 154(b) by 0 days.

(21) Appl. No.: 09/165,738

(22) Filed: Oct. 5, 1998

(51) Int. Cl.$^7$ ................................................. G02B 6/04
(52) U.S. Cl. ..................... 385/100; 385/115; 385/118; 362/554
(58) Field of Search ........................... 385/100, 103, 385/109, 113, 115, 119, 118; 362/32, 132, 551, 552, 554, 556

(56) References Cited

U.S. PATENT DOCUMENTS

| | | | |
|---|---|---|---|
| 3,610,231 | * 10/1971 | Takahashi | 385/118 |
| 4,777,571 | * 10/1988 | Morgan | 362/123 |
| 5,104,608 | * 4/1992 | Pickering | 362/32 |
| 5,226,709 | * 7/1993 | Labranche | 362/32 |
| 5,347,607 | * 9/1994 | Abernethy | 385/102 |
| 5,386,489 | * 1/1995 | Stokes | 385/100 |
| 5,960,145 | * 9/1999 | Sanchez | 385/116 |

\* cited by examiner

*Primary Examiner*—John D. Lee
*Assistant Examiner*—Ellen E. Kim
(74) *Attorney, Agent, or Firm*—A & J

(57) ABSTRACT

A folding means for bag knitting apparatus which is intended to fold inwardly the text-printed side portion of the double-layer material strip to be folded to overcome the problems of the conventional bag knitting apparatus, and comprises a clamping roller set, a folding rod set, a supporting set, and a pressing wheel. The double-layer material strip to be folded is opened and enclose the bottom of the folding rod such that the both side portion is placed between the grooves outside the folding rod and the pressing wheel, therefore the material strip is folded as it moves upward through the grooves outside the folding rod and the pressing wheel.

2 Claims, 8 Drawing Sheets

FLEXIBLE LIGHT-GUIDING PIPE

BACKGROUND OF THE INVENTION

For the show windows and the showcase of store or exhibiting place, lamps are often used to light the showpiece and enhance the delicacy. However, the lamps employed inevitably generate unwanted heat that might degrade the showpiece and the electric line may cause fire accident after a long-time operation.

To solve the above problem, a light-guiding pipe which contains a plurality of optical fiber is developed to provide lighting in above situations. The optical fibers are enclosed within a cylindrical opaque or translucency sleeve and emit light from their front end surface. This kind of light source arrangement can avoid above problem because there is no heat generated therefrom. Nevertheless, those pipes need auxiliary supporting means to maintain their positions during operation for suitable lighting. This mounting work is time-consuming and expensive.

It is an object of the present invention to provide a flexible light-guiding pipe which comprises a supporting wire made of flexible metal and arranged along the axis of the pipe, and the illuminating direction of the flexible light-guiding pipe can be adjusted manually.

It is another object of the present invention to provide a flexible light-guiding pipe which can be coupled to light source through a coupling unit.

It is still another object of the present invention to provide a flexible light-guiding pipe wherein the light emitted therefrom can be adjusted its focus by an adjusting cap with lens in front of the flexible light-guiding pipe.

It is still another object of the present invention to provide a flexible light-guiding pipe which can be bundled together by a connecting unit integral with the light source or being able to detach from the light source.

It is still another object of the present invention to provide a flexible light-guiding pipe which can form letter-shaped spot by placing a letter-shaped mask with light-emitting hole in front of the light-guiding pipe.

BRIEF DESCRIPTION OF THE DRAWINGS

In order to better understand the present invention, reference should be made to the following detailed description taken in junction with the accompanying drawings wherein.

DETAILED DESCRIPTION OF THE PREFERRED EMBODIMENT

Figure 1:
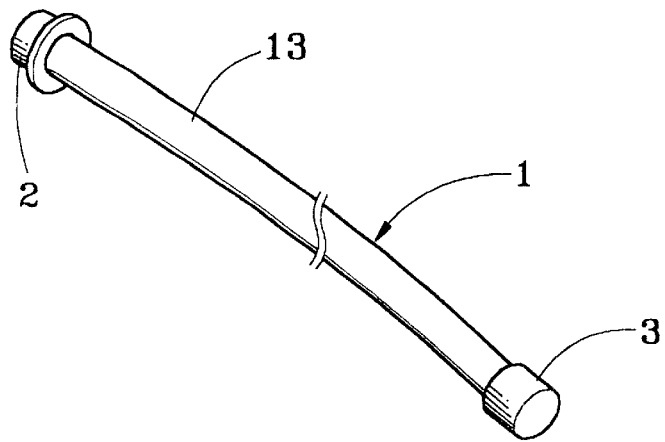
FIG. 1 shows the schematic view of the light-guiding pipe of the present invention.
Figure 2:
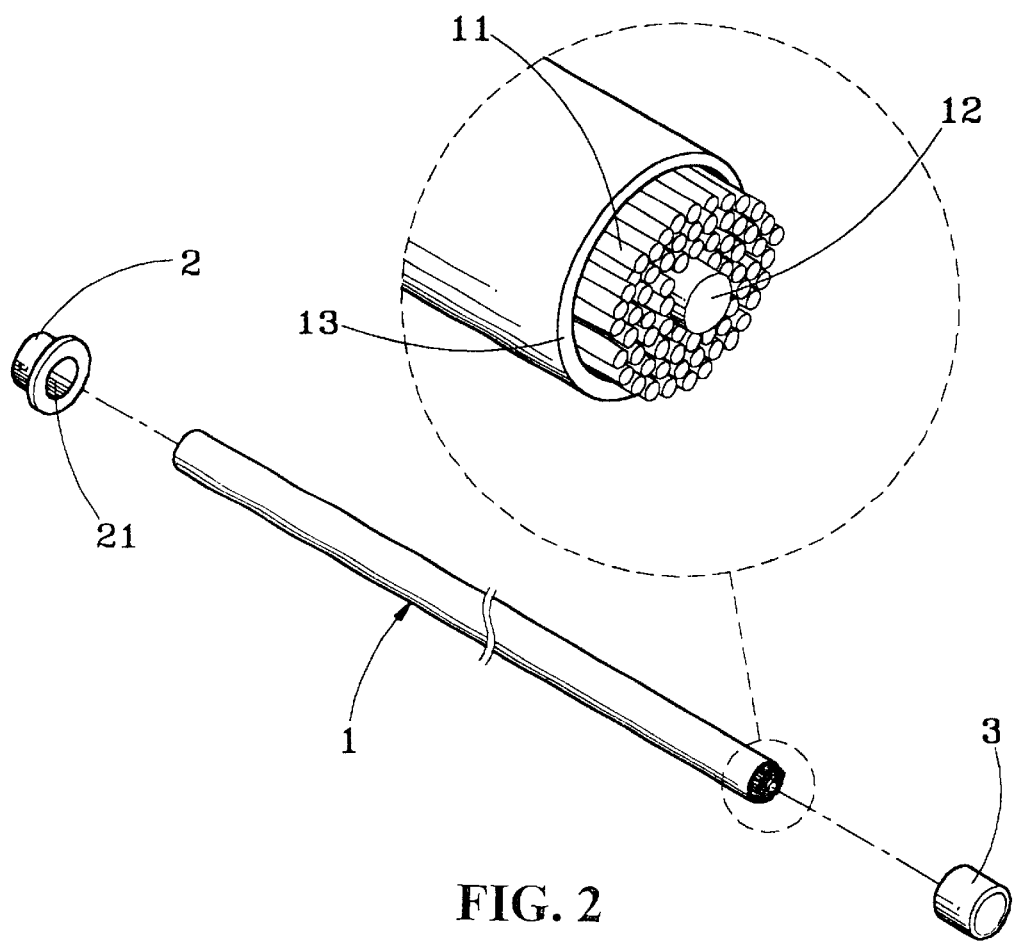
FIG. 2 is the exploded view of the light-guiding pipe of the present invention.

As shown in FIGS. 1 and 2, the light-guiding pipe according to the present invention comprises a plurality of optical fiber 11, a sleeve 13 enclosing the optical fiber, a supporting wire 12 arranged along the axis of the optical fiber 11, a coupling head 2 for coupling the optical fiber 11 to light source, and a transparent cap 3. The coupling head 2 has an aperture 21 to allow the light emitted from light source to couple to the optical fiber 11. The transparent cap 3 can block outside dust and moisture and form a preparatory space with the pipe 1 to allow the extrusion of the optical fiber 11 as the pipe 1 is adjusted its direction manually.

The supporting wire 12 in above arrangement can utilize a flexible metal wire, therefore the pipe 1 can be bent manually to change its laminating direction.

Figure 3:
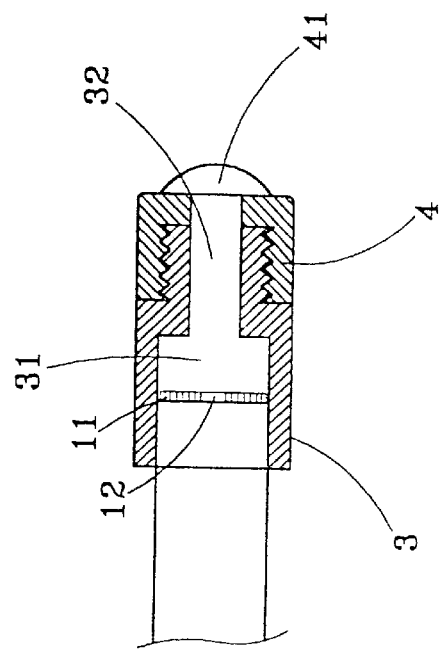
FIG. 3 is a view showing a preferred embodiment of the light-guiding pipe of the present invention.

FIG. 3 is a view showing a preferred embodiment of the light-guiding pipe of the present invention. The transparent cap 3 can be provided with a threaded hole 32 and a threaded portion 4 with lens. The light emitted from the pipe 1 can adjust its focus by the lens controlled by the threaded hole 32 and the threaded portion 4.

Figure 4:
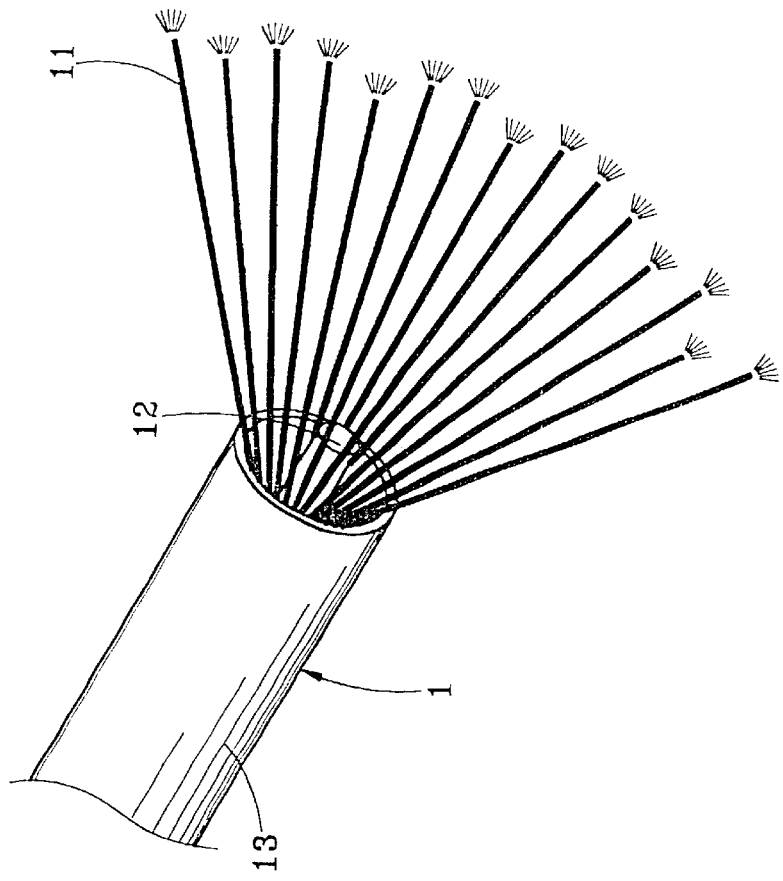
FIG. 4 is another view showing a preferred embodiment of the light-guiding pipe of the present invention.

FIG. 4 is another view showing a preferred embodiment of the light-guiding pipe of the present invention. The optical fiber 11 can extrude out of the pipe 1 by a proper length and the exposing portion of the optical fiber 11 can be bent to form a floriated pattern.

Figure 5:
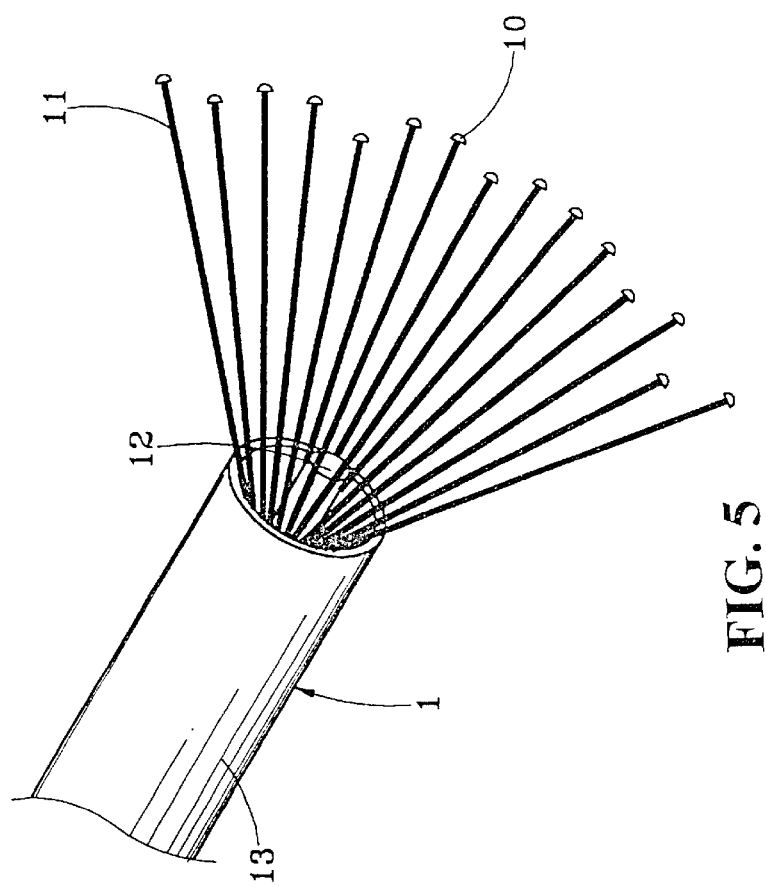
FIG. 5 is still another view showing a preferred embodiment of the light-guiding pipe of the present invention.

FIG. 5 is still another view showing a preferred embodiment of the light-guiding pipe of the present invention. The end of the optical fiber 11 is provided with a cover 10 to generate halo around the end portion of the optical fiber 11.

Figure 6:
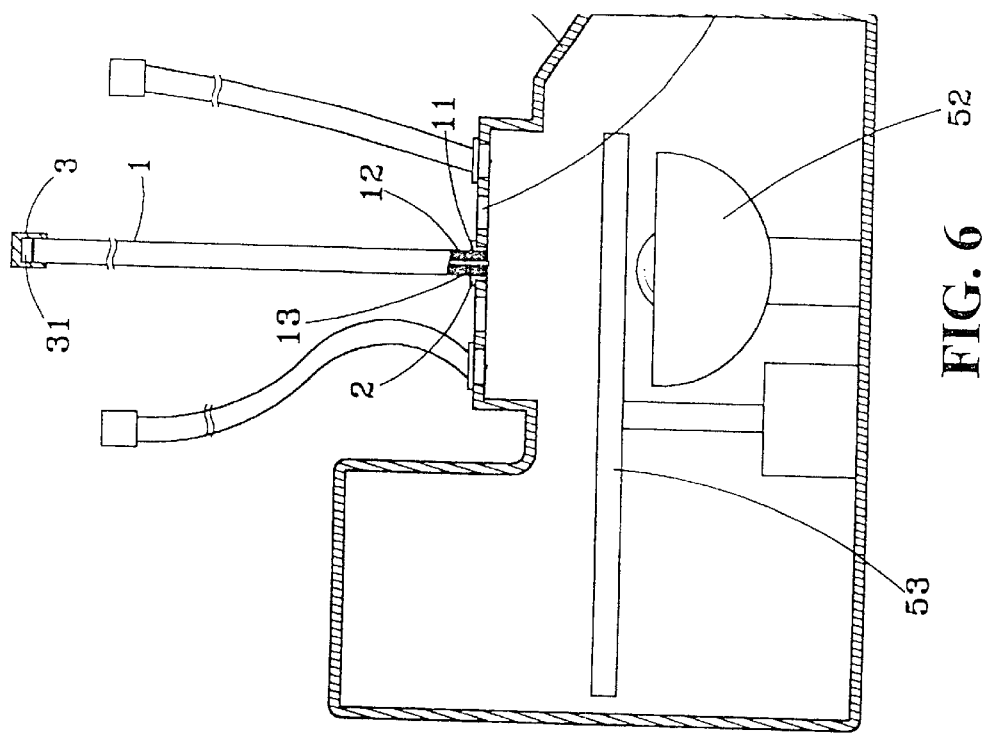
FIG. 6 is still another view showing a preferred embodiment of the light-guiding pipe of the present invention.
Figure 7:
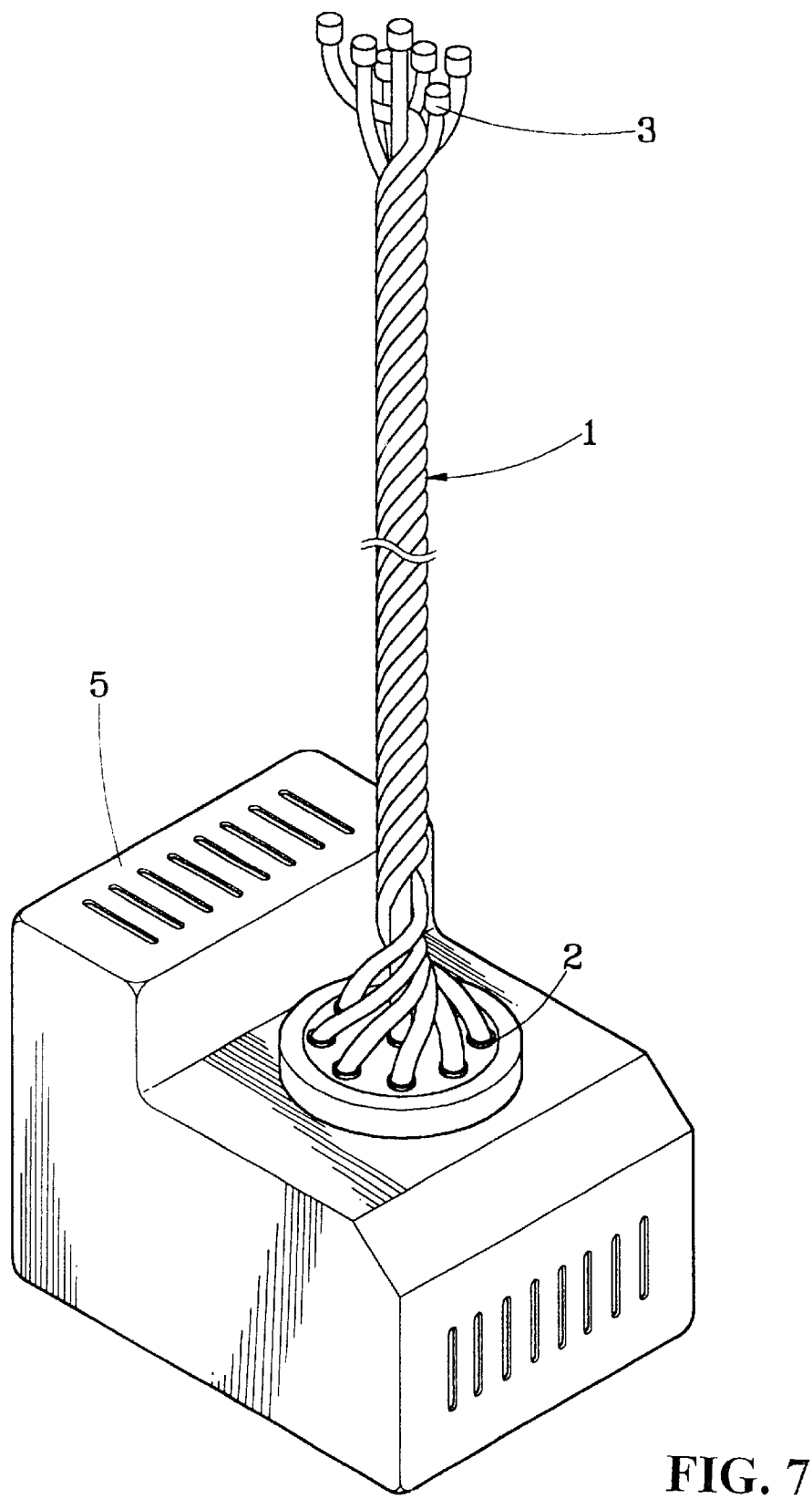
FIG. 7 is still another view showing a preferred embodiment of the light-guiding pipe of the present invention.

FIGS. 6 and 7 are still another views showing a preferred embodiment of the light-guiding pipe of the present invention. The light source 5 coupled to a plurality of light-guiding pipes 11 is provided with a spectroscopic disk 53. When light emitted from the light source 5 shine on the spectroscopic disk 53, light of predetermined color can transmit to the optical fiber 11. Therefore, the light-guiding pipe 1 can provide light of different color.

Moreover, the light source 5 is provided with a plurality of insertion holes 51 each of which can accommodate a plurality of light-guiding pipes 1, therefore the light-guiding pipes 1 can bundled to a desktop lamp.

Figure 8:
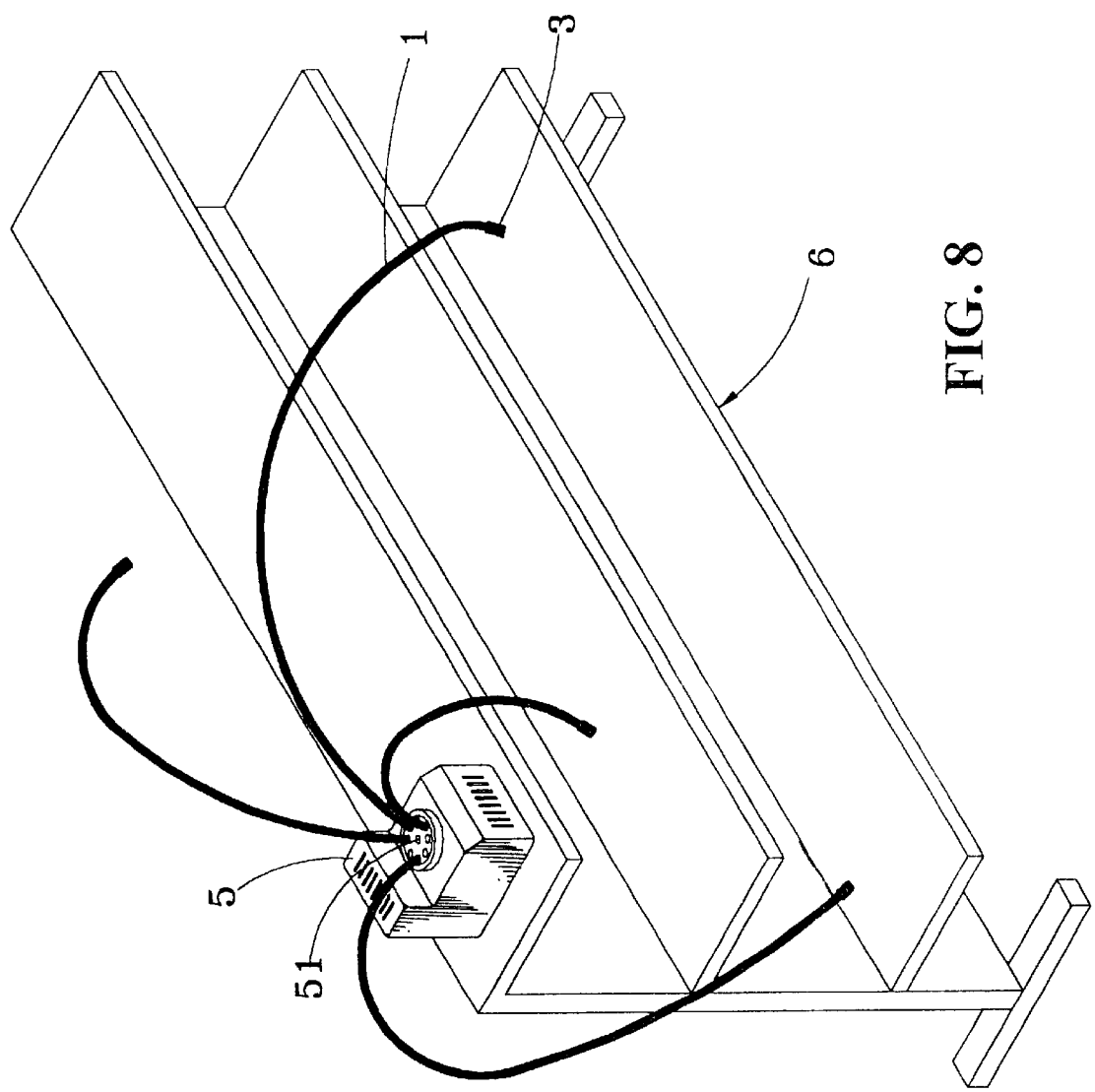
FIG. 8 is a view showing the operation of a preferred embodiment of the light-guiding pipe of the present invention.

FIG. 8 is a view showing the operation of a preferred embodiment of the light-guiding pipe of the present invention. The light-guiding pipes 1 are employed to light the showpiece placed within the showcase 6. The light source 5 is placed upon the showcase 6 and the light-guiding pipes 1 are bent to suitable positions. Because the light emitted from the light-guiding pipes 1 is cold light and the light source 5 accompanying with heat is far away from the showpiece, the exhibited pieces will not suffer to thermal degradation.

Moreover, the whole arrangement of the light-guiding pipes 1 is easy, even for a non-professional operator.

Figure 9:
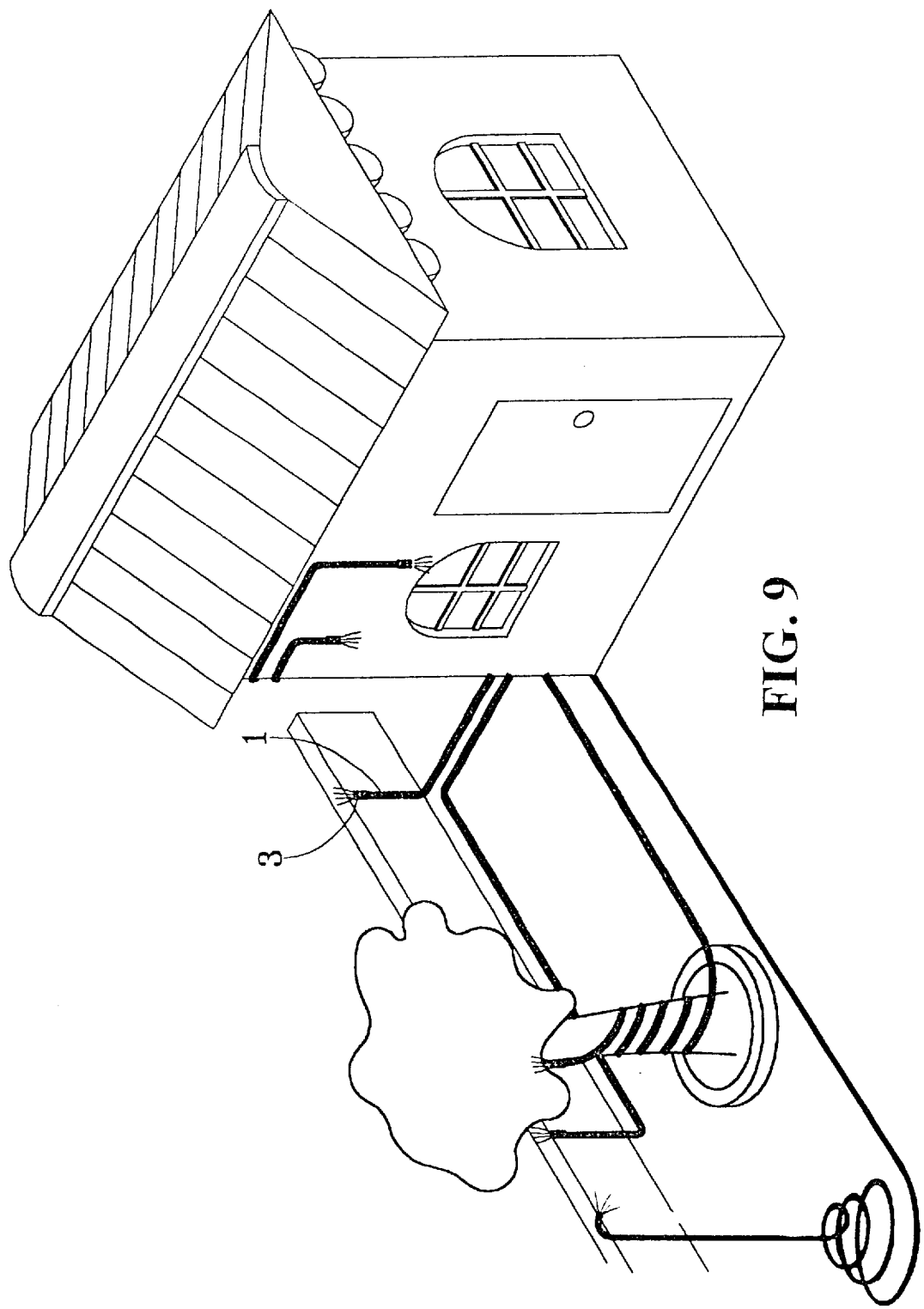
FIG. 9 is another view showing the operation of a preferred embodiment of the light-guiding pipe of the present invention.

FIG. 9 is another view showing the operation of a preferred embodiment of the light-guiding pipe of the present invention. The light-guiding pipes 1 can be prolonged for outdoor usage. The light-guiding pipes 1 can either entwine the tree in court yard or twine serpentinely to stand by itself.

Figure 10:
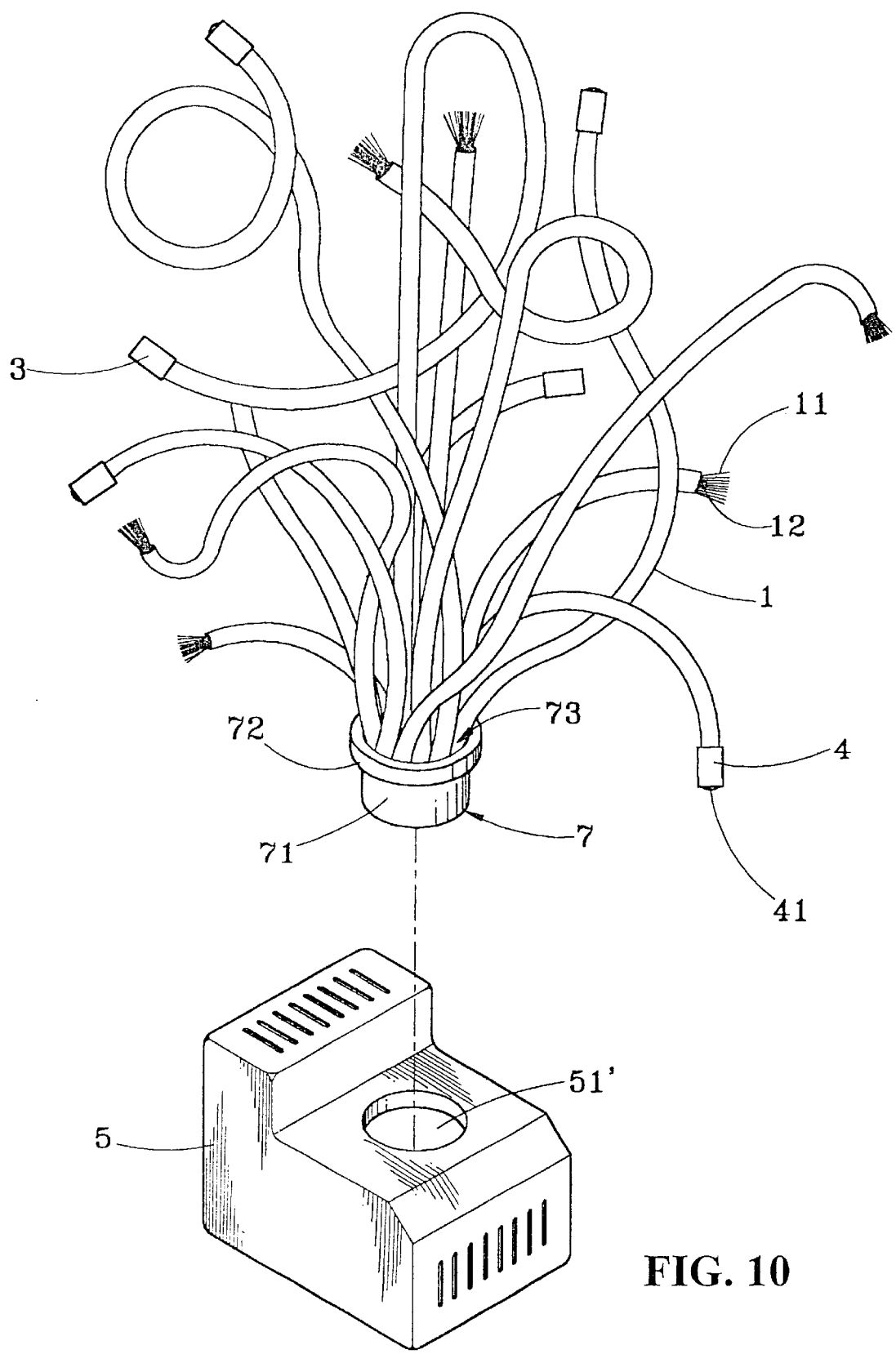
FIG. 10 is still another view showing the operation of a preferred embodiment of the light-guiding pipe of the present invention.

FIG. 10 is still another view showing the operation of a preferred embodiment of the light-guiding pipe of the present invention. A plurality of light-guiding pipe 1 are coupled to the light source 5 through a connecting unit 7. The connecting unit 7 comprises a cylindrical portion 71 inserted the hole 51 of the light source 5, a flange 72 on upper side thereof, and a hollow coupling region 73 formed between the flange 72 and the cylindrical portion 71 to receive the light-guiding pipe 1. The connecting unit 7 can be formed integrally with the light source 5 or detachable from the light source 5.

Figure 11:
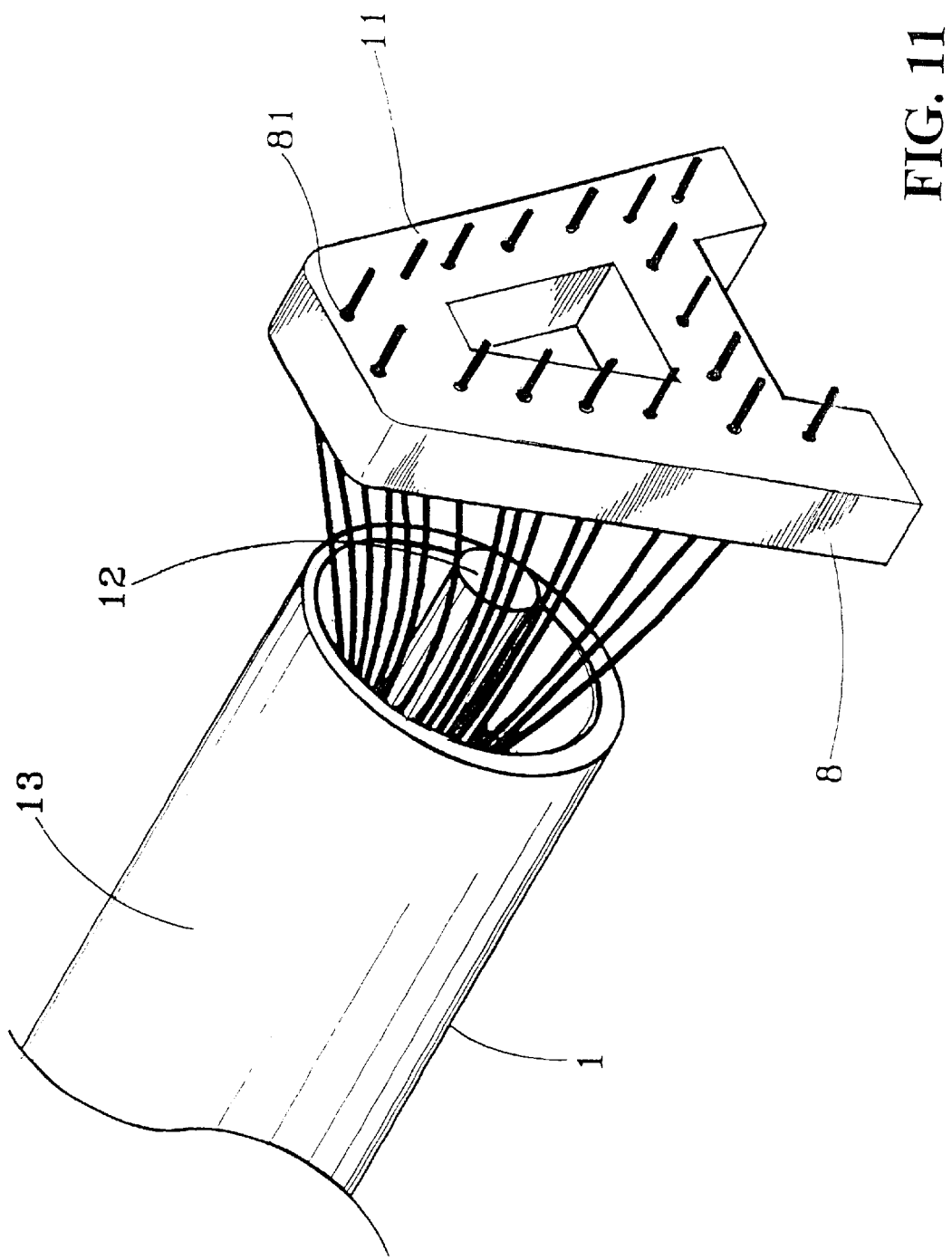
FIG. 11 is still another view showing the operation of a preferred embodiment of the light-guiding pipe of the present invention.

FIG. 11 is still another view showing the operation of a preferred embodiment of the light-guiding pipe of the present invention. The end portion of the optical fiber 11 extruded out of the light-guiding pipe 1 penerates into the light-emitting holes 81 of a pattern 8. The pattern 8 is light-weight and can be supported by the optical fiber 11. The pattern 8 can be letter, number or graph to cluster into a meaningful string.

While this invention has been described in connection with what is presently considered to be the most practical and preferred embodiment, it is to be understood that the invention is not limited to the disclosed embodiment and has various modifications. Therefore, the present invention is intended to cover various modifications and equivalent arrangements included within the spirit and scope of the appended claims.

What is claimed is:

1. An optical fiber device comprising:

a pattern having holes;

a first flexible light-guiding pipe comprising a first plurality of optical fibers and a first translucent sleeve enclosing said first plurality of optical fibers;

a first flexible supporting metal wire arranged axially within said first sleeve to enable said first flexible light-guiding pipe to adjust light direction thereof manually;

a transparent dust-proof cap provided at the light-emitting surface of the end of the first flexible light-guiding pipe;

a preparatory space formed between said first light-guiding pipe and said transparent cap for allowance of movement of the first plurality of optical fibers, wherein said transparent cap has a front end provided with a threaded hole and a threaded portion with a lens to adjust focus of emitted light; and a second flexible light-guiding pipe comprising a second plurality of optical fibers and a second translucent sleeve enclosing said second plurality of optical fibers;

a second flexible supporting metal wire arranged axially within said second sleeve to enable said second flexible light-guiding pipe to adjust light direction thereof manually, wherein said second plurality of optical fibers are extruded out of said second light-guiding pipe by a length, and the exposed portion of said second plurality of optical fibers form a floriated bent pattern so that the end portion of said second plurality of optical fibers extruded out of said second light-guiding pipe penetrates into said pattern having holes.

2. An optical fiber device comprising:

a pattern having holes;

a first flexible light-guiding pipe comprising a first plurality of optical fibers and a first opaque sleeve enclosing said first plurality of optical fibers;

a first flexible supporting metal wire arranged axially within said first sleeve to enable said first flexible light-guiding pipe to adjust light direction thereof manually;

a transparent dust-proof cap provided at the light-emitting surface of the end of the first flexible light-guiding pipe;

a preparatory space formed between said first light-guiding pipe and said transparent cap for allowance of movement of the first plurality of optical fibers, wherein said transparent cap has a front end provided with a threaded hole and a threaded portion with a lens to adjust focus of emitted light; and a second flexible light-guiding pipe comprising a second plurality of optical fibers and a second opaque sleeve enclosing said second plurality of optical fibers;

a second flexible supporting metal wire arranged axially within said second sleeve to enable said second flexible light-guiding pipe to adjust light direction thereof manually, wherein said second plurality of optical fibers are extruded out of said second light-guiding pipe by a length, and the exposed portion of said second plurality of optical fibers form a floriated bent pattern so that the end portion of said second plurality of optical fibers extruded out of said second light-guiding pipe penetrates into said pattern having holes.

* * * * *